United States Patent [19]

Brown, Jr. et al.

[11] Patent Number: 4,476,965
[45] Date of Patent: Oct. 16, 1984

[54] ELECTROMAGNETIC BRAKE WITH CAM RELEASE

[75] Inventors: Henry M. Brown, Jr., Leicester; Andrew J. Fredette, North Oxford, both of Mass.

[73] Assignee: Dana Corporation, Toledo, Ohio

[21] Appl. No.: 406,697

[22] Filed: Aug. 9, 1982

[51] Int. Cl.³ ............................................. F16D 65/30
[52] U.S. Cl. .................................. 188/171; 188/72.3
[58] Field of Search .................. 188/72.3, 163, 166, 188/170, 171, 173, 216; 192/84 A, 84 B

[56] References Cited

U.S. PATENT DOCUMENTS

| 1,695,665 | 12/1928 | Rueppel et al. | 188/72.3 |
| 2,059,028 | 10/1936 | Price | 188/171 |
| 2,512,565 | 6/1950 | Hallander | 188/171 |

FOREIGN PATENT DOCUMENTS

| 178107 | 4/1954 | Austria | 188/171 |
| 2054329 | 5/1971 | Fed. Rep. of Germany | 188/171 |

Primary Examiner—Duane A. Reger
Attorney, Agent, or Firm—Frank B. McDonald

[57] ABSTRACT

A normally engaged electromagnetic brake assembly includes an auxiliary cam release device. In a preferred form, the electromagnetic brake assembly includes interleaved and axially moveable sets of friction rotors and rings, normally urged together into frictional engagement by means of compression springs. The brake assembly includes an armature ring and coil assembly, wherein the armature ring is normally spaced from the energizable coil by the springs during brake engagement. Upon energization of the coil, the ring is pulled toward the coil against the bias of the springs, whereby the rotors and rings are released from frictional engagement with each other. The armature ring is fixed to an axially moveable shaft; the cam release mechanism is fixed to an opposite end of the same shaft. As the shaft is axially moveable, the cam release mechanism includes a torque arm partially rotatable relative to the shaft, whereby the movement of the arm effects movement of the armature ring against the bias of the springs.

2 Claims, 8 Drawing Figures

ELECTROMAGNETIC BRAKE WITH CAM RELEASE

BACKGROUND OF THE INVENTION

This invention relates to electromagnetic brake devices, particularly as utilized in industrial drive systems. More particularly, the invention relates to auxiliary release devices associated with such electromagnetic brake systems.

Prior art brake auxiliary release devices are cumbersome, bulky, and difficult to operate. Such mechanisms consist primarily of levers which pivot about fulcrum points to urge armature members against brake engaging spring forces. Depending on the strength and size of the spring or springs, the levers are often large relative to the brake device. In many situations, space limitations do not permit use of a lever and fulcrum arrangement to effect movement of the release mechanism, particularly where the lever must extend relatively far beyond the brake diameter.

In non-electromagnetic clutch or brake systems, cam release mechanisms have been utilized, but where cam mechanisms of the ball-ramp type have been employed, such systems have been of a dual-ramp construction. Thus, two relatively moving ramp members have been utilized to effect a given axial displacement. This design does not permit the convenient use of a thick plate hub for transmitting moderate to heavy axial forces through a shaft to the armature against relatively high brake engaging spring forces. Instead, stamped sheet metal members have been utilized in applications where stronger materials are more desirable.

SUMMARY OF THE INVENTION

The electromagnetic brake herein disclosed includes a compact cam release mechanism for systems not suitable for the lever and fulcrum devices of the prior art. To the extent that space and external considerations are important, the release mechanism of this invention is amenable to a construction which is integral to the total brake assembly. In a preferred embodiment the electromagnetic brake includes an electromagnetic armature-rotor assembly, the assembly having an energizable coil and an armature ring in spaced relationship therewith. The armature ring is biased by compressive spring forces in a direction opposing the energizing forces of the coil. A set of friction rings and a set of friction rotors are axially interleaved and axially moveable with respect to each other, one set being non-rotatably mounted with respect to the electromagnetic housing assembly, the other being rotatably mounted with respect thereto. The rings and rotors are urged into engagement with each other by the bias of the spring forces against the armature ring. The cam release device is preferably of the ball-ramp type, wherein a relatively thick cam hub member is fixed to a free end of a shaft to which the armature is fixed. The hub member includes ball-receiving detents disposed annularly thereabout, and a single cam plate is utilized therewith, the latter having a plurality of ramps, each disposed for cooperative engagement with one of the balls contained in the hub member. As the shaft is axially moveable, the hub, and hence the armature, are moved axially relative to the cam plate as a torque arm fixed to the cam plate is rotated through a small arc.

DETAILED DESCRIPTION OF PREFERRED EMBODIMENTS

Figure 1:
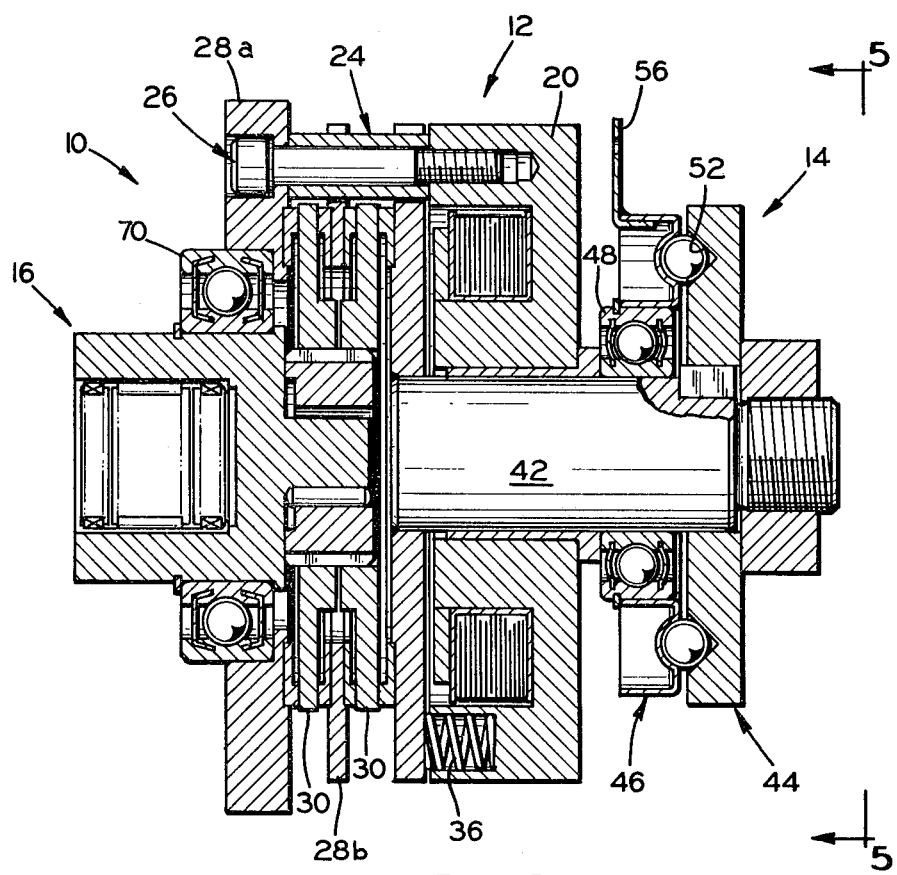
FIG. 1 is a sectional view of a preferred embodiment of an electromagnetic brake of the present invention.
Figure 5:
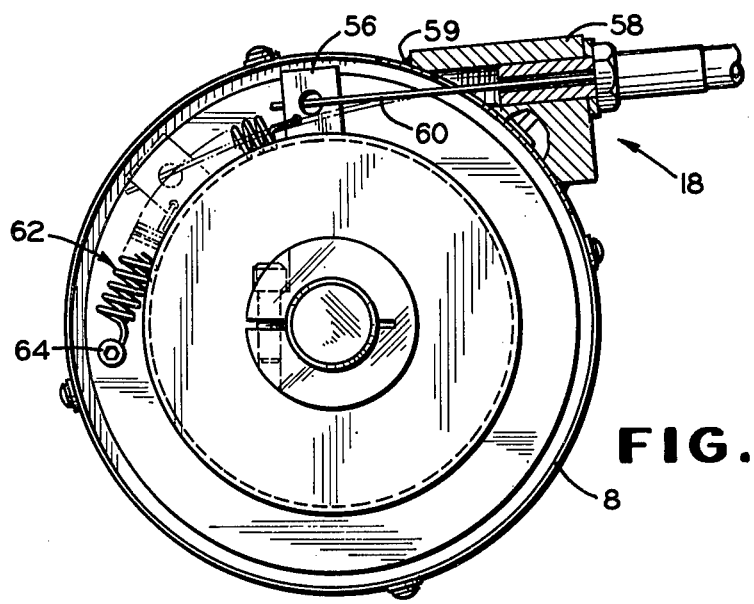
FIG. 5 is a preferred embodiment of a cable and spring mechanism for actuating the cam release device of FIG. 3.

Referring first to FIG. 1, a preferred embodiment of an electromagnetic brake assembly 10 comprises several sections, which include an armature-rotor assembly 12, an auxiliary cam release device 14, and an optional overrunning clutch unit 16. In FIG. 5, a cable release system 18 is also shown in a view along lines 5—5 of FIG. 1.

Figure 2:
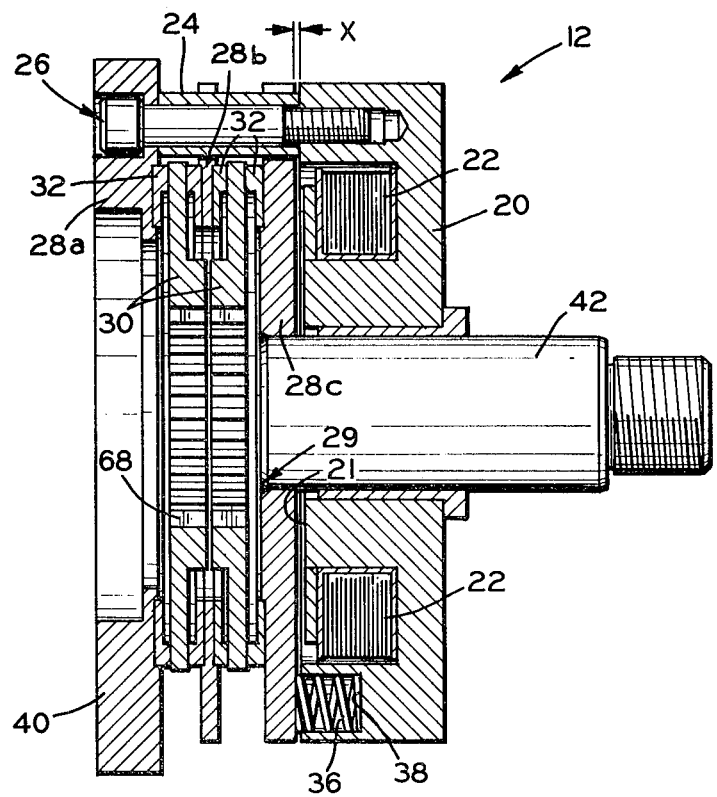
FIG. 2 is a sectional view of an armature-rotor assembly, as employed in the preferred embodiment of FIG. 1.

Referring to FIG. 2, the section comprising the armature-rotor assembly 12 is shown isolated for explanation. The armature-rotor assembly 12 includes a coil housing 20 which contains an annular electrically energizable coil 22. A rotor housing 24 is secured to the coil housing 20 by mechanical fasteners 26. Enclosed radially inwardly of the rotor housing 24 are interleaved sets of axially engageable friction rings 28 and friction rotors 30. The friction rings are non-rotatable with respect to the rotor housing 24, while the friction rotors 30 are rotatable with respect thereto. In the preferred embodiment shown, the friction rings 28 include friction facings 32 for engagement with the relatively moveable, smoothly surfaced metal rotors 30.

Figure 4:
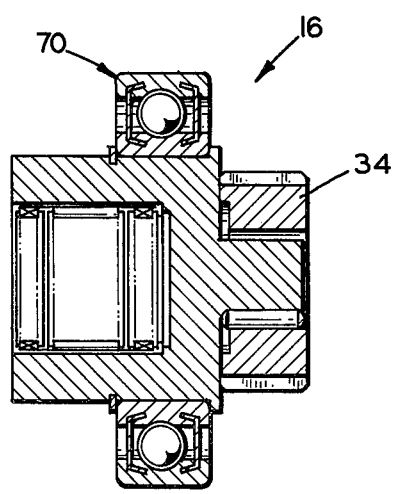
FIG. 4 is a view of an overrunning clutch unit as incorporated in the preferred embodiment of FIG. 1, although the latter is optional.

Referring momentarily to FIG. 4, in the preferred embodiment as herein described, the friction rotors are internally splined to a connecting member 34 of an optional overrunning clutch unit 16, as more particularly shown therein. As the friction rings are non-rotatable with respect to the rotor housing 24, it will be appreciated that rotation of the rotor housing 24 will drive the friction rings relative to the friction rotors.

Referring back to FIG. 2, a plurality of annularly disposed compression springs 36 are circumferentially positioned about the armature coil housing 20. The springs 36 are lodged in spring seats 38, and bear against the right most friction ring 28c as shown. (For convenience the friction rings are designated 28a, b, and c from left to right.) The friction ring 28c doubles as both friction ring and an armature ring, and is normally urged leftwardly by the force of the springs 36 to hold the friction rotors and rings in engagement. Upon energization of the coil 22 however, the armature rings 28c is pulled toward the coil 22, thus freeing the rings and rotors from binding frictional engagement with one another.

It will now be appreciated that the armature friction ring 28c is non-rotatably but axially moveable relative to the rotor housing 24. The intermediate friction ring 28b is also non-rotatably but axially moveable with respect to the housing 24, and is, in the preferred embodiment, externally splined to the rotor housing 24. However, the left most friction ring 28a is an integral part of an end plate assembly 40, which is secured by the mechanical fasteners 26 to the rotor housing 24, and hence to the coil housing 20. The armature friction ring 28c is internally affixed to an auxiliary movable shaft member 42, for example as shown herein by welded connection at 29.

Figure 3:
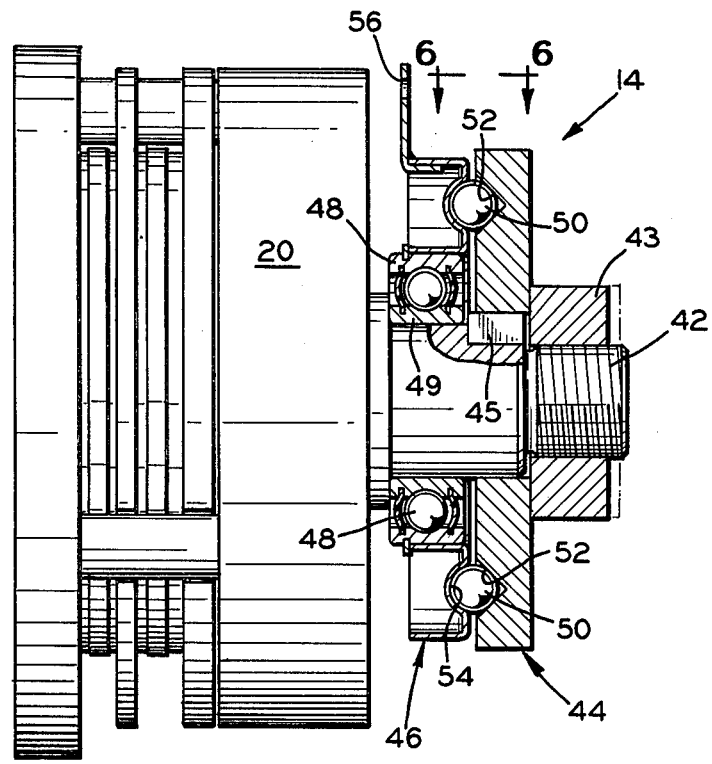
FIG. 3 is a cam release device employed as an integral part of the electromagnetic brake of FIG. 1.

Referring now to FIG. 3, the cam release device 14 is more particularly shown. The device includes a hub member 44, which is also fixedly secured to the shaft 42. An interacting cam plate 46 is partially rotatable between predetermined limits about the shaft 42 on bearings 48. The hub 44 is secured against rotation about the shaft 42 by means of a key 45 lodged between the hub and shaft. The hub is axially secured to the shaft 42 by means of a clamping collar 43 which is threaded to the shaft 42 in the preferred embodiment, and which bears against the inner race 49 of the bearing 48 through the latter key. The hub member 44 includes balls 50 which are seated in conical recesses or detents 52 therein. In the preferred form, the detents 52 contain grease or other suitable lubricant. The balls 50 cooperate with ramps 54 of the cam plate 46, as shown more particularly in FIG. 6A. Thus referring momentarily to FIG. 6A, it will be appreciated that as the cam plate 46 is rotated through an arc "A" of approximately 41°, the hub member 44 will be urged rightwardly the distance "X" as depicted by arrows. In the preferred embodiment, the latter distance generally represents the gap spacing "X" between the armature friction ring 28c and the extreme leftward wall 21 of the armature coil housing 20, shown in FIG. 2. The distance "X" is preferably in the range of 8 to 14 thousands of an inch. The hub 44 is axially secured to the shaft 42, and rotation of the cam plate 46 will thus urge the armature ring 28c axially toward the coil, as will also the electrical energization of the coil. Thus the movement of the cam plate provides an auxilliary means by which the electromagnetic brake can be released, when the friction rotors and rings become disengaged from one another.

Figure 6A:
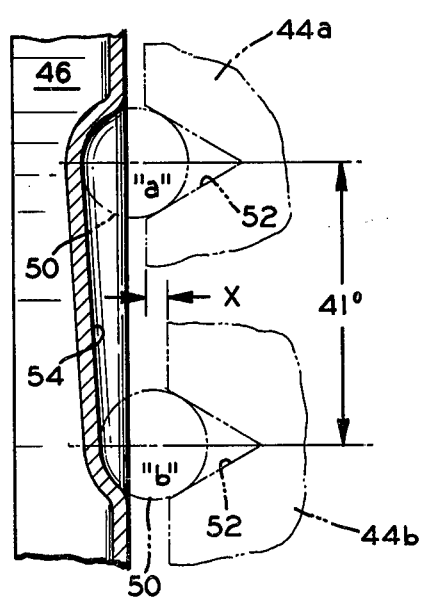
FIG. 6A is a fragmentary view of the cam release device, along lines 6—6 of FIG. 3.
Figure 7:
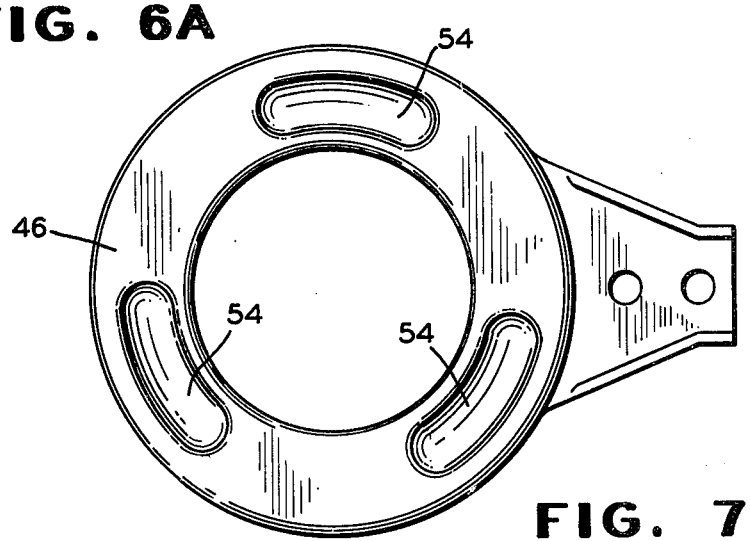
FIG. 7 is a face view of a preferred embodiment of a cam plate utilized with the brake device of the present invention.

Referring now back to FIG. 6A, the ball 50 is shown in phantom in its two extreme positions "a" and "b" along the ramp 54. In the upper position of the ball, the hub 44a is situated in the axially leftward position of the ramp to depict the brake engagement position, while in the lower position, the hub 44b is in the axially rightward position of the ramp to depict the brake disengaged position. FIG. 7 shows a face view of the cam plate 46, in which a view of the relative orientation of the ramps 54 is depicted, there being at least three of such ramps in the preferred embodiment as shown. A torque arm 56 (FIGS. 1 and 3) is utilized for actuating limited rotation of the ramps through the aforementioned arc.

Figure 6B:
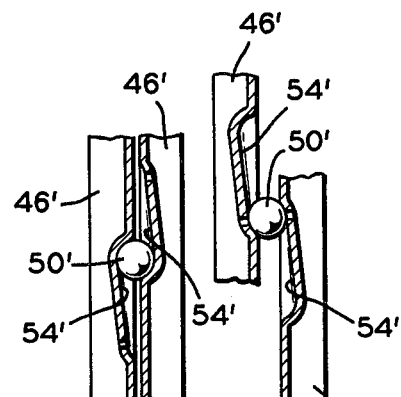
FIG. 6B are counterpart views of a prior art cam release device, one in a brake-engaged position, the other in a brake-released position.

While FIG. 6A depicts the interaction of the cam release device of the present invention, FIG. 6B provides counterpart views of a prior art cam release device. Thus, the prior art device of FIG. 6B utilizes two cooperating cam plate members 46', as opposed to the present device comprising a single cam plate member 46 and a thick metal hub member 44 per FIG. 6A. As will be appreciated by those skilled in the art, in order to effect a given axial displacement, the angle of the single ramp 54 must be twice as great as that of the two ramps 54' for a given relative angular displacement of the respective members. It will also be appreciated that in the present invention, the balls 50 are never displaced relative to the hub member 44 (FIG. 6A), although they are free to rotate within the conical recesses or detents 52 of the hub member. By contrast, neither of the two interacting cam plates 46' of the prior art (FIG. 6B) remains stationary relative to the balls 50'.

In the preferred embodiment, a cable release system is employed for actuation of the cam release device 14. In FIG. 5, the cable release system 18 is shown affixed to an outer housing 8, which encases the entire assembly as herein described. The system 18 includes a cable housing 58 which is secured by welded connection 59 as shown to the outer housing 8. A cable line 60 extends through the cable housing and is connected to the torque arm 56 wherein actuation is effected by pull forces on the cable line 60. The pull forces are effected against the bias force of a tension return spring 62, wherein one end of the spring 62 is affixed to the torque arm 56, while the other is secured to a fixed connection member 64 attached to the housing 8. The return spring 62 provides means for return of the torque arm to the brake-engaged position.

Referring now to FIG. 4, an optional overrunning clutch unit 16 is coupled to internally splined bores 68 of the aforedescribed friction rotors 30. Those skilled in the art will appreciate that the clutch unit 16 will limit brake effectiveness to one direction of shaft rotation only. Thus, the internally splined bores 68 engage the externally splined stub shaft 34 of the clutch unit 16. As will be apparent from the same figure, the overrunning clutch unit 16 is supported within the end plate assembly 40 of the electromagnetic brake assembly 10 by bearings 70 (FIG. 1). Although the overrunning clutch assembly 16 is utilized in the preferred embodiment the clutch unit as disclosed herein, could be readily substituted for a straight full shaft connection. For example, the splined stub shaft 34 could alternatively continue as a straight shaft member without overrunning clutch capability.

In the preferred embodiment, the ball-and-ramp type cam release device 14 produces a mechanical advantage in the range of 3 or 4 to 1 (3:1-4:1). The pull on the cable line 60 as required to overcome the force of the tension spring is in the range of thirty to fifty pounds (30-50 lbs.), and is applied manually. The compression springs 36 are six (6) in number, and are uniformly spaced in an annular array within the coil housing 20. The total brake-applied compressive spring force is approximately one hundred and fifty pounds (150 lbs.). Also in the preferred embodiment, three balls 50 are employed, and are equidistantly spaced apart within the hub member 44.

Referring back to FIG. 1, the operation of the electromagnetic brake assembly 10 can now be described as follows. The friction rings 28 and rotors 30 of the brake assembly 10 are normally frictionally engaged. Thus the gap "X" is normally open as the armature compression springs 36 urge the friction rings 38 and the friction rotors into binding engagement with each other. The brake is released by the electrical energization of the coil 22, whereupon the coil pulls the armature ring 28c thereto, closing the gap "X". This action then frees the friction rotors and rings from axial engagement with each another. The cam release device 14, on the other hand, provides an auxiliary or emergency means of brake release. Thus upon failure of electrical supply to the electromagnetic coil 22, the torque arm 56 may be actuated by the cable release system 18, whereby the hub 44 is then urged rightwardly thereby to close the gap "X". A reverse or opposing turning movement of the lever or torque arm 56 secures brake re-engagement; thus, back or forth movement of the torque arm axially articulates the armature ring 28c against the bias of the springs 36. More specifically, when a tensile force is applied to the cable line 60, the cam plate 46 rotates through an arc equivalent to the length of the cam ramps 54. As the cam plate rotates through the arc, the three balls 50 force the hub member 44 axially rightwardly, which imparts an axial force to the threaded clamping collar 43. The collar then pulls the shaft 42, which urges the armature ring 28c against the force of the compression springs 36 to allow the friction rotors 30 to turn freely. Upon release of the tension on line 60, the balls 50 return back to the brake-engaged position of the ramps 53, and the armature ring 28c returns back to the brake-engaged position to re-establish frictional engagement of rotors 28 and rings 28. The return spring 62 preferably imparts a nominal tensile force to urge the cam plate 46 back to the brake-engaged position in the event that movement of the balls is impeded by small imperfections or debris in the cam ramps 54.

Although the preferred embodiments have been described in the examples depicted in FIGS. 1 through 7, there are numerous other embodiments which fall within the following appended claims.

What is claimed is:

1. In an electromagnetic brake having an axis and including an electromagnetic housing assembly, said assembly having an energizable coil and an armature ring in spaced relationship therewith along said axis, said brake further including a spring, said armature ring being biased by said spring in a direction opposing the energizing forces of said coil thereon, said brake further including one set of friction rings and one set of friction rotors, said sets being axially interleaved and axially moveable relative to each other, said set of friction rings being rotatably mounted with respect to said electromagnetic housing assembly, said set of friction rotors being rotatably mounted with respect to said assembly, said sets of rings and rotors being urged into engagement with each other along said axis by said bias of said spring against said armature ring, an axially movable shaft, said armature ring being fixed to a first end of said axially moveable shaft; an improvement comprising a cam release device fixed to a second end of said axially moveable shaft, said cam release device including a torque arm rotatable relative to said shaft about said axis between two limits of an arc, whereby said device effects movement of said armature ring against the bias of said spring, said cam release device comprising a plurality of balls and ball engaging radially disposed ramps, a cam hub member fixed to said axially moveable shaft, said ramps being disposed in a stamped cam plate, said plate being rotatable relative to said axially moveable shaft, said balls being annularly spaced apart and undisplaceably seated within said cam hub member.

2. The electromagnetic brake of claim 1 wherein said limits of said arc of said torque arm comprise a brake engagement and a brake disengagement position, wherein said arm is normally biased toward said brake engagement position via a secondary spring.

* * * * *